US012201201B2

(12) United States Patent
Adamberry

(10) Patent No.: US 12,201,201 B2
(45) Date of Patent: Jan. 21, 2025

(54) HOLDER FOR TSA-APPROVED LOCKS

(71) Applicant: Robert Adamberry, Hong Kong (CN)

(72) Inventor: Robert Adamberry, Hong Kong (CN)

( * ) Notice: Subject to any disclaimer, the term of this patent is extended or adjusted under 35 U.S.C. 154(b) by 0 days.

(21) Appl. No.: 17/767,968

(22) PCT Filed: Oct. 9, 2020

(86) PCT No.: PCT/CN2020/120008
§ 371 (c)(1),
(2) Date: Apr. 11, 2022

(87) PCT Pub. No.: WO2021/068893
PCT Pub. Date: Apr. 15, 2021

(65) Prior Publication Data

US 2024/0090638 A1 Mar. 21, 2024

(30) Foreign Application Priority Data

Oct. 11, 2019 (CN) ......................... 201921691166.7

(51) Int. Cl.
*E05B 65/52* (2006.01)
*A45C 13/42* (2006.01)
*E05B 37/00* (2006.01)

(52) U.S. Cl.
CPC .......... *A45C 13/42* (2013.01); *E05B 37/0034* (2013.01); *E05B 65/52* (2013.01)

(58) Field of Classification Search
CPC ...... A45C 13/42; E05B 37/0034; E05B 65/52
See application file for complete search history.

(56) References Cited

U.S. PATENT DOCUMENTS 3,971,458 A * 7/1976 Koenig .................. A45C 13/42 24/387
6,522,253 B1 * 2/2003 Saltus ................... E05B 37/025 340/568.1
2005/0167494 A1 * 8/2005 Tropp ................ G06Q 30/0241 70/285

(Continued)

*Primary Examiner* — Gary C Hoge

(57) ABSTRACT

Disclosed is a holder for TSA-approved locks, the multi-purpose protective holder comprising a holder body, a TSA-approved and recognised logo window provided on at least one of either a front face and a back face of the holder body for exposing a TSA-approved and recognised logo; a code zone provided on one side of the holder body to expose code dials; and a keyhole zone provided at the underside of the holder body to expose a keyhole and a TSA key number, wherein the holder body is further attached with a card case body including a card case bottom wall and a card case top wall. The holder as disclosed may facilitate customs officials in identifying the TSA-approved and recognised logo so as to avoid the circumstances of removing the lock by force, causing damage due to misidentification; besides, it is convenient for a passenger to place an information card in the card case to record names/usages of the items inside the luggage as well as personal information. Besides, the holder as disclosed may be further used in collaboration with an electronic tracking device so as to provide preliminary evidence for the passenger to claim against the service providers upon occurrence of losses or damage to items in the luggage.

11 Claims, 3 Drawing Sheets

(56) References Cited

U.S. PATENT DOCUMENTS

| | | | | |
|---|---|---|---|---|
| 2014/0026626 | A1* | 1/2014 | Lai | E05B 35/105 70/21 |
| 2018/0040263 | A1* | 2/2018 | Freeman | A45C 13/42 |
| 2020/0022468 | A1* | 1/2020 | Song | A44B 19/301 |
| 2021/0049884 | A1* | 2/2021 | Siao | G09F 3/037 |

* cited by examiner

HOLDER FOR TSA-APPROVED LOCKS

FIELD

The present disclosure relates to a lock holder, in particular the Taglock™, which in the context of this document, relates to a multi-purpose protective lock holder used for protection of locks, visibility of luggage while in transit, and the possible integration of a user's personal data and/or tracking devices so as to allow for the identification, detection and security of the user's valuables at all times.

BACKGROUND

The Transportation Security Administration (TSA) is an agency of the United States (U.S.) Department of Homeland Security with the authority over the security of the travelling public in the U.S. The TSA were created in light of a growing security concern within the domestic and international travel industry, leading to the implementation of more rigid customs procedures which were to be enforced by officials, stationed in all transit ports where entry and exit to the U.S. can be accessed. To allow customs officials such as the Transportation Security Officers (TSOs) to service passengers and the general public with greater security measures in place, a means of accessing luggage without damaging passenger's property was required.

In order for customs officials to gain access to passenger's check-in luggage for inspection purposes, customs officials are expected to remove any and all locking mechanism so as to conduct authorised security inspections of passenger goods. Any luggage in transit that is deemed necessary for inspection under the security measures set out within the TSA criteria, is approved for luggage secured by a locking mechanism to be removed by force, damaging and often destroying the lock beyond further use.

To better manage this process, a dual-access locking system was introduced so as to allow pre-approved locks to be manufactured using a special mechanism that would give access to both the passenger and the TSOs. This system was further developed under TSA's Screening Partnerships Program (SPP), so as to allow for TSA to approve private organisations to carry out the same procedures at transit ports both domestic to the U.S. and internationally where TSA's jurisdiction does not apply. To produce such locks, manufacturers are granted approval by licensed TSA partners such as Travel Sentry and Safe Skies, so that they may supply TSA approved locks to customers worldwide. These locks are distinguishable to customs officials by both a special code which denotes a specific master key, as well as a logo symbol that would certify the lock with officials, to be a TSA approved lock.

The dual-access locking system allowed for TSA approved locks to be accessed via two means:

a. Individual lock owners (passengers) are able to open and secure their TSA approved locks by either a numbered combination dial which can be personalised to their choice of number sequence or through the use of an individual customer key specific to certain lock models.

b. TSOs and any other customs officials that require access to a TSA approved lock are able to use a unique master key, produced in certified quantities for use by authorised personnel only. All TSA approved locks are manufactured to carry with them a special code which is unique to a complimentary master key, carried by customs officials in order to help with identification of the corresponding key so as to open the lock without damaging property. This dual-access locking system is now available in some 40 countries with new authorities joining in the future.

The circumstances at which a customs official is required to open an item of luggage raises two issues:

Firstly, customs officials conduct passenger screening processes in large volumes on a daily basis and as such through human error by means of sizing or unclear visibility of a TSA approved and recognised logo, can often cause a lock to be removed by force. These cases of human error can lead to frustrations from both passengers and airlines, as well as in multiple cases, the damage and or loss of property, costing both passengers and airlines greatly in personal and financial losses.

Secondly, in the event that customs officials are required to conduct an inspection on an individual's check-in luggage, if the luggage does not contain any personal details within it to identify the passenger, luggage deemed 'prohibited' would be destroyed with no way of informing the passenger and owner of the luggage as passengers are not present during the inspection process. This can cause both an inconvenience to passengers, as well as the loss of personal property resulting in further personal and financial losses.

In order to solve these issues, the inventor has designed a multi-purpose protective lock holder to house/enclose both a TSA approved lock to secure luggage valuables, protect the lock and provide the dual-access locking system for customs officials, while also providing a large tag area to help passengers identify their luggage while simultaneously providing customs officials with a clear distinguishable product to reduce human error and provide clear identification areas for passengers to be notified when necessary.

SUMMARY

To overcome the drawbacks in the prior art, the present disclosure provides a multi-purpose holder fitted to a TSA-approved lock, which holder may present a clear indication to a customs official so as to prevent his/her misjudgment; the holder is further provided with a card zone to help the passenger identify and even track his/her own luggage.

To achieve the object above, the present disclosure adopts technical solutions below:

A holder for a TSA-approved lock, comprising of a holder body; a TSA-approved and recognised logo window provided on at least one of a front face and a back face of the holder body to reveal a TSA approved and recognised logo; and a code zone provided on one side of the holder body to expose a code zone; and a keyhole zone provided at the underside of the holder body to expose a keyhole and a TSA key number, wherein the holder body is further attached with a card case body including a card case bottom wall and a card case top wall, the card case bottom wall and the card case top wall jointly enclosing a cavity inside the card case body; the card case top wall is provided with a framed top wall reinforcing ridge which surrounds a window zone; on the top of the holder body is provided a first limit flange, and at the underside of the holder body is provided a second limit flange.

Preferably, a shackle hole is provided on each of the left and right sides of the first limit flange; or a first shackle-toe hole is provided on one side of the first limit flange and a second shackle hole is provided on the first limit flange.

Preferably, to limit the TSA-approved lock from moving within the holder body, the second limit flange provided at the underside of the holder body has an annular shape, a middle portion of the second limit flange being the keyhole zone; or, the second limit flange provided at the underside of the holder body has a strip shape, two sides of the second limit flange being the keyhole zone.

Preferably, the bottom wall of the card case bottom wall is configured with at least one of air holes, bumps, or sucker discs.

Preferably, the window zone is positioned between the card case top wall and the top wall reinforcing ridge, acting as a closure to hold replaceable items, such as passenger data recording items or tracking items.

Preferably, the window zone is made of a clear material in such situations that further protection of inserted personal details is required.

Preferably, the holder body and the card case body are integrally formed to ensure strength, safety, and visibility of the lock and the lock holder.

Preferably, one side of the card case body distal from the holder body is provided with an open slot for placing an item to be accommodated or taking out the accommodated item. This slot allows for a corresponding card-shape item to be inserted into the card case body, and it is the passenger/user who autonomously decides on inserting or removing the item. The item for example may be a personal data card, a membership card, a discount card, a tracking card, or a tracking device, as well as any other form of decorative sheet or plate, so as to satisfy the passenger's travel needs.

The present disclosure offers the following beneficial effects: helping the customs officials easily identify the TSA-approved and recognised logo so as to confirm that the passenger uses a TSA-approved lock, thereby reducing and preventing the circumstance of destroying the lock by force due to misjudgments; facilitating the passenger to record the names and purposes of internal items, so as to prevent the customs officials from detaining a checked-in eligible item due to misidentifying the item; providing preliminary evidence for the passenger to claim against the service providers or an eligible authority when used in collaboration with an electronic tracking device in the case that the items in the luggage are lost or damaged.

Figure 1A:
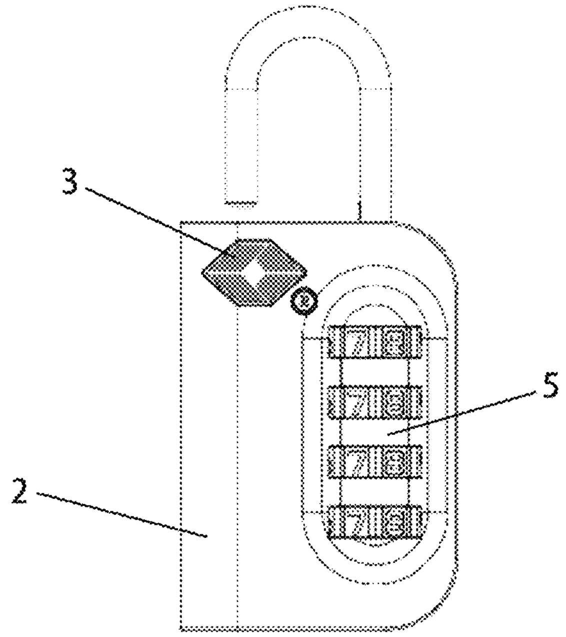
FIG. 1*a* shows a front view of a TSA-approved lock, which can be fitted within the multi-purpose protective lock holder according to the present disclosure.

Reference Numerals: 2—TSA-approved lock; 20—shackle; 3—TSA-approved and recognised logo; 4—keyhole; 5—code dial; 1—holder body; 10—TSA-approved and recognised logo window; 14—code zone; 16—keyhole zone; 17—first limit flange; 18—second limit flange; 19—shackle hole; 12—card case body; 120—card case bottom wall; 121—card case top wall; 122—top wall reinforcing ridge; 124—window zone; 126—cavity; 128—air hole; 129—bump; 19*a*—first shackle hole; 19*b*—second shackle hole.

DETAILED DESCRIPTION OF EMBODIMENTS

Hereinafter, technical solutions of the present disclosure will be described in a clear and complete manner with reference to the accompanying drawings. Apparently, the embodiments as described herein are only part, rather than all, of the embodiments of the present disclosure. All other embodiments derived by those skilled in the art without exercise of inventive work based on those as described herein all fall within the protective scope of the present disclosure.

Figure 1B:
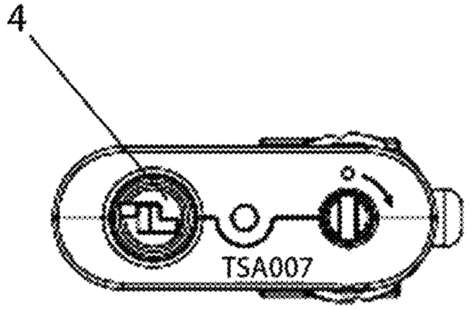
FIG. 1*b* is a view of the bottom surface of a TSA approved lock model shown in FIG. 1*a;*
Figure 2:
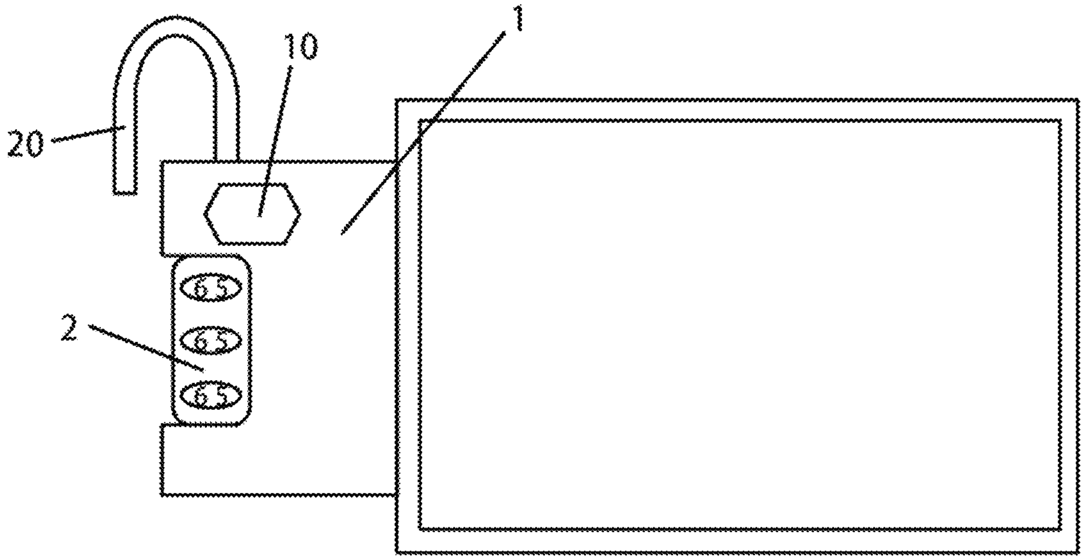
FIG. 2 is a schematic diagram of a fitted state between an embodiment of the lock holder of the present disclosure and the TSA-approved lock.
Figure 3:
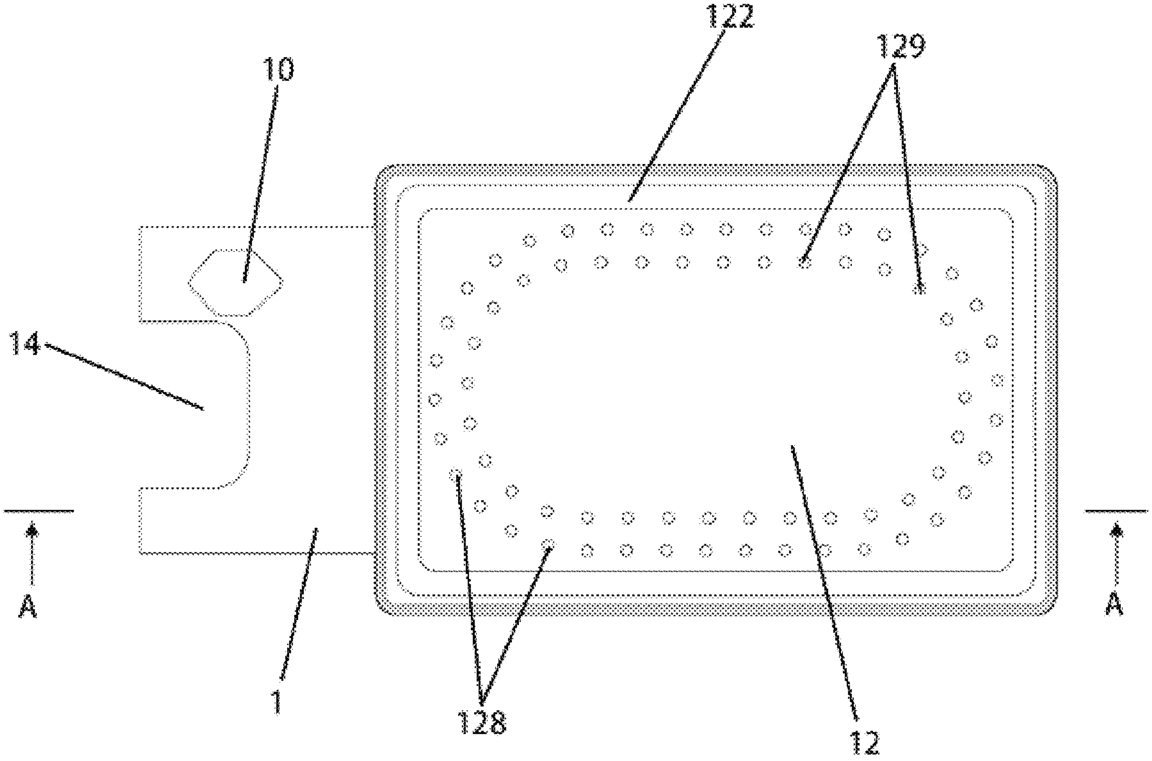
FIG. 3 is a schematic diagram of a state in which the lock holder of the present disclosure is not fitted with the TSA-approved lock.

As shown in FIGS. 1*a* and 1*b*, a typical TSA-approved lock 2 provides a TSA-approved and recognised logo 3 easily identifiable to customs officials, a keyhole 4 for an authorized customs official to unlock with a specific master key, a corresponding key number being specified nearby the key hole 4, e.g., TSA007, and one or more code dials 5 for a user (passenger) to set his/her personal unlock code. It needs to be noted that although the current available types of TSA-approved and recognised logos for customs officials to distinguish are very limited (only two), the TSA-approved and recognised logos are not limited to the hexagonal logo shown in the drawings. Furthermore, although a specific type of TSA-approved lock whose unlock code is set by the user via code dials is shown in the drawings, the present disclosure is not limited to that. The TSA-approved lock may be unlocked in any manner permitted by current technical means, e.g., fingerprint scanning or voice recognition. Those skilled in the art may easily understand that the holder as disclosed is applicable for TSA-approved locks bearing any TSA-approved and recognised logo and/or being unlocked in any manner.

Please refer to FIGS. 2-5, the holder for a TSA-approved lock comprises of a holder body 1, the holder body 1 comprises: a TSA-approved and recognised logo window 10 positioned on at least one of either the front face and the back face of the holder 1 and configured for revealing the TSA-approved and recognised logo 3, wherein the shape/size of the TSA-approved and recognised logo window is preferably fitted to a specific TSA-approved and recognised logo, and the TSA-approved and recognised logo window may also be replaced with a clear material, as long as it is easy to identify by the customs officials; a code zone 14 positioned on one side face of the holder body 1 and configurable for exposing code dials 5 or other security code methods; and a first limit flange 17 positioned on the top of the holder body 1, wherein a shackle hole 19 is provided on each of the left and right sides of the first limit flange 17. Another purpose of the code zone 14 is to provide a large enough space, as an opening for inserting and loading the TSA-approved lock 2 into the holder body 1. Specifically, the code zone 14 is arranged at an edge of the holder body, facilitating the passenger to unlock and lock with the unique code set by himself/herself, and meanwhile, the lock body may be inserted or removed via the code zone 14. The size and shape of the code zone 14 may not only guarantee inserting or removing the lock body, but also may guarantee that the TSA-approved lock will not be detached during normal use. The size, position and shape of the code zone 14 may be adjusted to fit with various lock models, including, but not limited to: padlock, combination lock, fingerprint scanning lock, voice recognition lock, and keyed lock, etc.

Those skilled in the art may understand that because the shackle 20 is of an inverted U shape, it includes a fixed end always attached to the lock body and a movable end (the shackle toe) detachable from the lock body, while the shackle hole 19 provided on at least one side of the first limit flange 17 should allow for the fixed end and the movable end of the inverted U-shaped shackle 20 to penetrate through as a whole, and the shackle hole 19 provided at the other side may at least allow for the movable end of the shackle to penetrate through. As a preferred embodiment, the shackle holes 19 can be further divided into a first shackle hole 19*a* specific for the fixed end of the shackle 20 and a second shackle hole 19*b* specific for the movable end of the shackle 20. In the meanwhile, as a preferred embodiment of the first limit flange 17, the first limit flange 17 may be arranged with a sheet structure shown in FIG. 4 so as to increase its service life; at this point, the second shackle hole 19*b* specific for the movable end of the shackle may be positioned above the first limit flange 17.

Figure 5A:
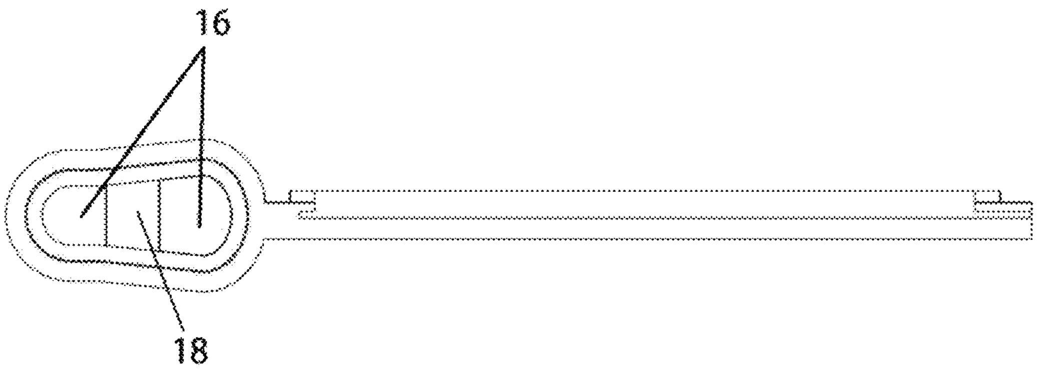
FIGS. 5*a* and 5*b* are bottom views of FIG. 3, showing two embodiments of the bottom structure of the holder for a TSA-approved lock.
Figure 5B:
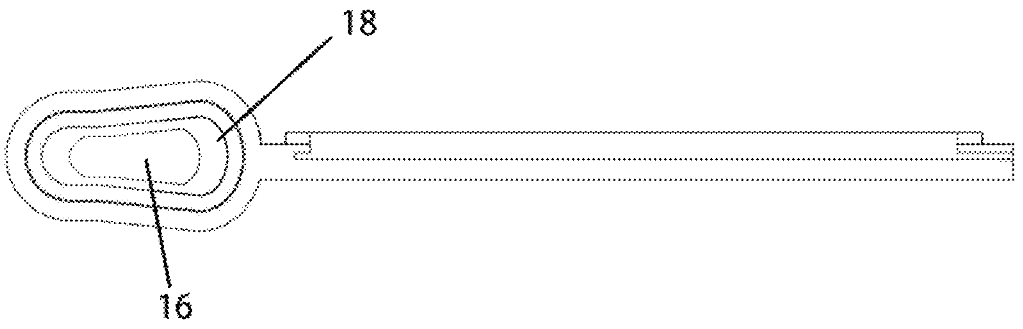

The holder body 1 further comprises: a second limit flange 18 positioned at the lower portion of the holder body 1; as shown in FIG. 5*a* and FIG. 5*b*, the second limit flange 18 may be arranged as a ring shape, a middle portion of which provides a keyhole area 16 exposing the keyhole 4 and the TSA-key number; the second limit flange 18 may also be arranged as a strip shape, the left and right sides of which expose the keyhole 4 and the TSA key number. The holder body 1 allows for the shackle 20 of the TSA-approved lock 2 to penetrate through the first shackle hole 19*a*; however, the TSA-approved lock 2 is entirely wrapped inside the holder body 1. The first limit flange 17 and the second limit flange 18 are configured for limiting the TSA-approved lock 2, such that the TSA-approved lock 2 will not be detached from the upper or lower sides of the shackle body 1.

Those skilled in the art may understand that since the holder body 1 wraps most part of the TSA-approved lock 2 and specifically exposes the keyhole area 16 for exposing the keyhole 4 and the TSA key number, and the TSA-approved and recognised logo window 10 for revealing the TSA-approved and recognised logo, the customs officials may easily identify the passenger using a TSA-approved lock so as to avoid the circumstance at which the customs officials have to remove the lock by force, often damaging and destroying beyond further use.

The holder body 1 is preferably made of a material with appropriate elasticity and/or strength so as to avoid damaging the holder body 1 when the TSA-approved lock 2 is inserted into the holder body 1 or taken out therefrom. When placing the TSA-approved lock 2 into the holder, the shackle 20 of the TSA-approved lock 2 is first unfastened, and then the TSA-approved lock 2 is inserted into the holder body 1 through the code zone 14 which provides enough space to be accommodated; the unfastened shackle 20 may penetrate out through the shackle hole 19 on at least one side of the first limit flange 17, and the upper end face of the body part of the TSA-approved lock 2 is stopped by the first limit flange 17, while the lower end face of the TSA-approved lock 2 is exactly supported by the second limit flange 18, and meanwhile the keyhole zone 16 on two sides or middle portion of the second limit flange 18 may just expose the keyhole 4, the corresponding key number, and other information. When it is needed to take out the TSA-approved lock 2, the shackle 20 of the TSA-approved lock 2 is first unfastened; then, the shackle 20 is rotated to a position not affecting the removal, such that the TSA-approved lock 2 may conveniently be withdrawn through the code zone 14 so as to be finally removed from the holder body 1.

Figure 4:
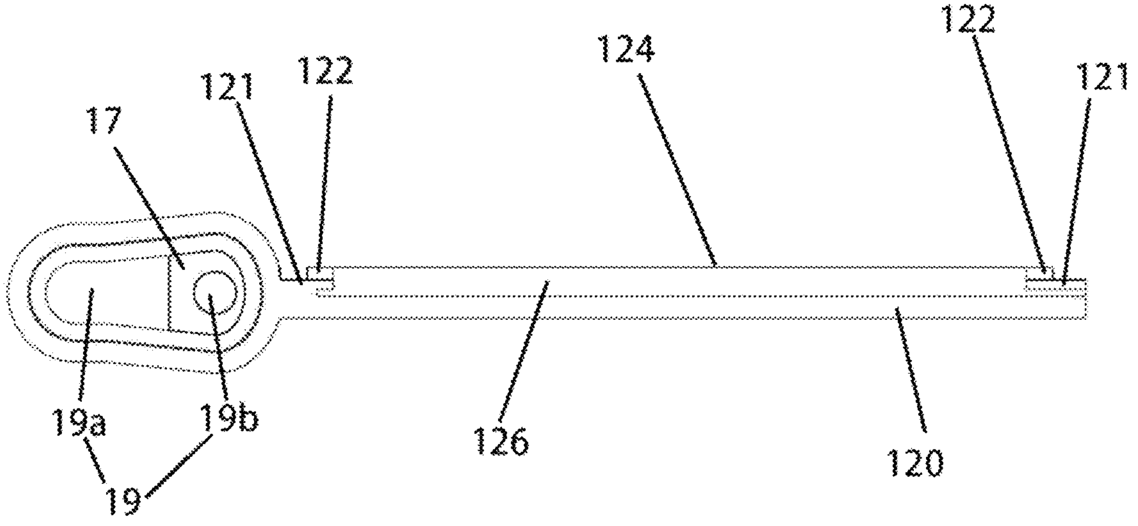
FIG. 4 is a sectional view along line A-A in FIG. 3.

To further integrate a typical luggage information card and/or a specific electronic positioning/tracking device to the structure of the holder body 1, the holder body 1 may transversely extend to be attached with a card case body 12; preferably, the holder body 1 and the card case body 12 are integrally formed. As shown in FIG. 4, the card case body 12 further comprises a card case bottom wall 120 and a card case top wall 121, wherein the card case bottom wall 120 and the card case top wall 121 jointly enclose a cavity 126 inside the card case body 12. Preferably, on the card case top wall 121 there is a frame provided as a top wall reinforcing ridge 122 which surrounds a card window zone 124, wherein the card window zone 124 made of a clear material can facilitate the customs officials to conveniently identify, through the clear card window zone 124, the personal information provided by the passenger on the card. Of course, to control costs, the card window zone 124 may be omitted; instead, items such as a paper card or cards of rigid material to be placed therein, may be directly held between the card case bottom wall 120 and the top wall reinforcing ridge 122, or directly positioned inside the cavity 126.

Those skilled in the art may understand that on the card case bottom wall 120 is configured with at least one of air holes 128, bumps 129, or suction discs (not shown). As changes to flight altitude would cause air pressure changes in the cabin, provision of the air holes 128 enables the air pressure inside and outside of the cavity 126 to be automatically balanced. Provision of the bumps may increase the frictional force between the item accommodated in the cavity 126 and the cavity 126 proper such that if the item accommodated is relatively small, the item does not sway freely inside the cavity 126. Additionally, some smaller suction disc structures may be used in place of part of all of the bumps 129 to make the item accommodated in the cavity 126 more stable, such that the item will not move freely.

A card positioned in the card case body 12 may record some luggage information and personal information which need to be presented to the customs officials. The card case body 12 may also be used for accommodating an electronic luggage tracking device (with a note-like or card-like shape). The electronic tracking device may record longitude-latitude coordinates of the luggage at regular intervals, such that the passenger may obtain, via a mobile phone or other means, the coordinate information recorded by the electronic tracking device, and then determine whether his/her luggage is at a corresponding location based on the stay duration and coordinate information, and in the case of losses or damage to the items inside, such information may serve as preliminary evidence to claim against service providers. Additionally, a card-type proximity device with a near-distance positioning/automatic alarm function may be further included in the card case body 12 so as to facilitate the user to quickly locate or find his/her own luggage or item. As the electronic tracking device and the card-type proximity device are not inventive points of the present disclosure, they will not be detailed here.

Those skilled in the art may understand that the holder for a TSA-approved lock is made of a flexible material such as rubber, which may effectively absorb the impact occurring during luggage transit and thus provide protection to the TSA-approved lock and other accommodated items such as the electronic tracking device; or be made of metal, so as to further protect the device and content. Preferably, the card window zone 124 made of a clear material may be positioned between the card case top wall 121 and the top wall reinforcing ridge 122 to hold it tightly. The passenger may open the card window zone 124 to insert the information card and/or the card-shaped electronic tracking device into the cavity 126 and then close the card window zone 124. Of course, an open slot (not shown) for placing an item to be accommodated or removing the accommodated item may be arranged on one side of the card case body 12 distal from the holder body 1, such that a hard card or other card-type electronic device may be conveniently inserted from the open slot.

Additionally, the holder body 1 and the card case body 12 may also be provided separately (not shown), for example, a through-hole may be provided on the card case body 12, such that the shackle 20 of the TSA-approved lock 2 may penetrate through the through-hole to be securely locked. In this way, the holder body 1 and the card case body 12, which are originally provided separately, may be locked to each other via the TSA-approved lock 2.

The embodiments above do not constitute limitation to the protection scope of the technical solution. Any modifications, equivalent substitutions, and improvements within the spirit and principle of the embodiments above should be included within the protection scope of the present disclosure.

I claim:

1. A multi-purpose protective holder for a Transportation Security Administration TSA-approved lock, comprising of a holder body (1); a TSA-approved and recognised logo window (10) provided on at least one of either a front face and a back face of the holder body for exposing a TSA approved and recognised logo (3); a code zone (14) provided on one side of the holder body (1) to expose code dials (5); and a keyhole zone (16) provided at the underside of the holder body (1) to expose a keyhole (4) and a TSA key number, wherein the holder body (1) is further attached with a card case body (12) including a card case bottom wall (120) and a card case top wall (121), the card case bottom wall (120) and the card case top wall (121) jointly enclosing a cavity (126) inside the card case body (12); the card case top wall (121) is provided with a framed top wall reinforcing ridge (122) which surrounds a card window zone (124); on the top of the holder body (1) is provided a first limit flange (17), and at the underside of the holder body (1) is provided a second limit flange (18).

2. The multi-purpose protective holder for a TSA-approved lock according to claim 1, wherein a shackle hole (19) is provided on each of the left and right sides of the first limit flange (17), or a first shackle hole (19*a*) is provided on one side of the first limit flange (17) and a second shackle hole (19*b*) is provided on the first limit flange (17).

3. The multi-purpose protective holder for a TSA-approved lock according to claim 2, wherein the second limit flange (18) is of an annular shape, a middle part of which is a keyhole zone (16); or the second limit flange (18) is of a strip shape, two sides of which are the keyhole zone (16).

4. The multi-purpose protective holder for a TSA-approved lock according to claim 2, wherein on the card case bottom wall (120) are configured with at least one of air holes (128), bumps (129), and sucking discs.

5. The multi-purpose protective holder for a TSA-approved lock according to any one of claim 1, wherein the card window zone (124) is positioned between the card case top wall (121) and the top wall reinforcing ridge (122).

6. The multi-purpose protective holder for a TSA-approved lock according to claim 5, wherein the card window zone (124) is made of a clear material.

7. The multi-purpose protective holder for a TSA-approved lock according to claim 6, wherein the holder body (1) and the card case body (12) are integrally formed.

8. The multi-purpose protective holder for a TSA-approved lock according to claim 7, wherein one side of the card case body (12) distal from the holder body (1) is provided with an open slot for placing an item to be accommodated or removing the accommodated item.

9. The multi-purpose protective holder for a TSA-approved lock according to claim 3, wherein on the card case bottom wall (120) are configured with at least one of air holes (128), bumps (129), and sucking discs.

10. The multi-purpose protective holder for a TSA-approved lock according to claim 2, wherein the card window zone (124) is positioned between the card case top wall (121) and the top wall reinforcing ridge (122).

11. The multi-purpose protective holder for a TSA-approved lock according to claim 3, wherein the card window zone (124) is positioned between the card case top wall (121) and the top wall reinforcing ridge (122).

* * * * *